(12) United States Patent
Wagner et al.

(10) Patent No.: US 8,988,837 B2
(45) Date of Patent: Mar. 24, 2015

(54) POWER DISTRIBUTION SYSTEM INCORPORATING GROUND FAULT INTERRUPT PROTECTION

(75) Inventors: Carl A. Wagner, Beloit, WI (US); Kyle Stephen Ives, Rockford, IL (US); Jeffrey T. Wavering, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 139 days.

(21) Appl. No.: 13/492,003

(22) Filed: Jun. 8, 2012

(65) Prior Publication Data

US 2013/0329321 A1 Dec. 12, 2013

(51) Int. Cl.
*H02H 3/16* (2006.01)
*H02H 9/08* (2006.01)

(52) U.S. Cl.
CPC . *H02H 3/16* (2013.01); *H02H 9/08* (2013.01); *H02H 3/165* (2013.01)
USPC .................................. 361/42; 361/47; 361/49

(58) Field of Classification Search
USPC ............................................... 361/42, 47, 49
See application file for complete search history.

(56) References Cited

U.S. PATENT DOCUMENTS

| | | | | |
|---|---|---|---|---|
| 3,764,853 A * | 10/1973 | Beachley, Jr. | .................... | 361/44 |
| 5,142,646 A * | 8/1992 | Nachtigall | ...................... | 361/42 |
| 5,334,939 A * | 8/1994 | Yarbrough | .................... | 324/424 |
| 5,363,269 A | 11/1994 | McDonald | | |
| 5,504,655 A | 4/1996 | Underwood et al. | | |
| 5,786,971 A * | 7/1998 | Chan et al. | ...................... | 361/42 |
| 5,986,860 A * | 11/1999 | Scott | ............................... | 361/42 |
| 6,108,180 A | 8/2000 | Severino et al. | | |
| 6,329,810 B1 * | 12/2001 | Reid | ......................... | 324/117 H |
| 6,583,975 B2 | 6/2003 | Bax | | |
| 7,609,492 B2 | 10/2009 | Maier | | |
| 7,683,745 B2 | 3/2010 | Gouhl et al. | | |
| 8,023,236 B2 | 9/2011 | Greither et al. | | |
| 8,130,479 B2 | 3/2012 | Maier | | |
| 8,169,762 B2 | 5/2012 | Baxter et al. | | |
| 8,542,021 B2 * | 9/2013 | Scott et al. | .................... | 324/509 |
| 2006/0125486 A1 | 6/2006 | Premerlani | | |
| 2008/0002315 A1 | 1/2008 | Maier | | |
| 2008/0112098 A1 * | 5/2008 | Stone | ............................... | 361/42 |
| 2011/0075304 A1 * | 3/2011 | Hamer | .......................... | 361/47 |
| 2013/0119933 A1 * | 5/2013 | Flack et al. | ................... | 320/109 |

OTHER PUBLICATIONS

Search Report and Written Opinion for EP Application No. 13170773.9 mailed on Jul. 14, 2014.

* cited by examiner

*Primary Examiner* — Zeev V Kitov
(74) *Attorney, Agent, or Firm* — Carlson, Gaskey & Olds, P.C.

(57) ABSTRACT

A power distribution system includes multiple uniform power distribution modules and multiple uniform mating connectors. A portion of the mating connectors are connected to the power distribution modules directly and the remainder are connected to the power distribution modules via a ground fault interrupt adapter.

15 Claims, 4 Drawing Sheets

POWER DISTRIBUTION SYSTEM INCORPORATING GROUND FAULT INTERRUPT PROTECTION

TECHNICAL FIELD

The present disclosure is related to power distribution systems, and more particularly to ground field interrupt protection for power distribution systems.

BACKGROUND OF THE INVENTION

Power distribution systems for distributing Alternating Current (AC) loads often require ground fault interrupt (GFI) protection. In particular loads with potential contact with people and/or loads in close proximity to combustibles (such as jet engine fuel) are frequently GFI protected. In order to provide GFI protection, some form of current sensing, such as a current transformer (CT) sensor, and GFI detection circuitry, is implemented in the protected power distribution system. The additional components required for GFI protection can either be built into every power distribution module within the power distribution system, thereby adding unnecessary weight and cost, or specialized GFI capable modules can be used on circuits requiring GFI protection, thereby reducing uniformity and increasing the complexity of the power distribution system.

SUMMARY OF THE INVENTION

Disclosed is a power distribution system having a plurality of uniform power distribution modules, wherein each of the power distribution modules includes a module connector, a plurality of uniform mating connectors operable to connect to the power distribution modules, and at least one ground fault interrupt adapter operable to connect one of the plurality of uniform power distribution modules to one of the plurality of uniform mating connectors and thereby provide ground fault interrupt protection to the one of the uniform power distribution modules.

Also disclosed is a ground fault interrupt (GFI) adapter for a power distribution system having: a plurality of power phase pass throughs operable to pass electrical power from a power module connector to a mating connector through the ground fault interrupt adapter, at least one current sensor operable to sense a current passing through the ground fault interrupt adapter, and at least one neutral connection operable to connect a neutral line within the ground fault interrupt adapter to a neutral line of a connected mating adapter.

These and other features of the present invention can be best understood from the following specification and drawings, the following of which is a brief description.

DETAILED DESCRIPTION OF AN EMBODIMENT

Figure 1:
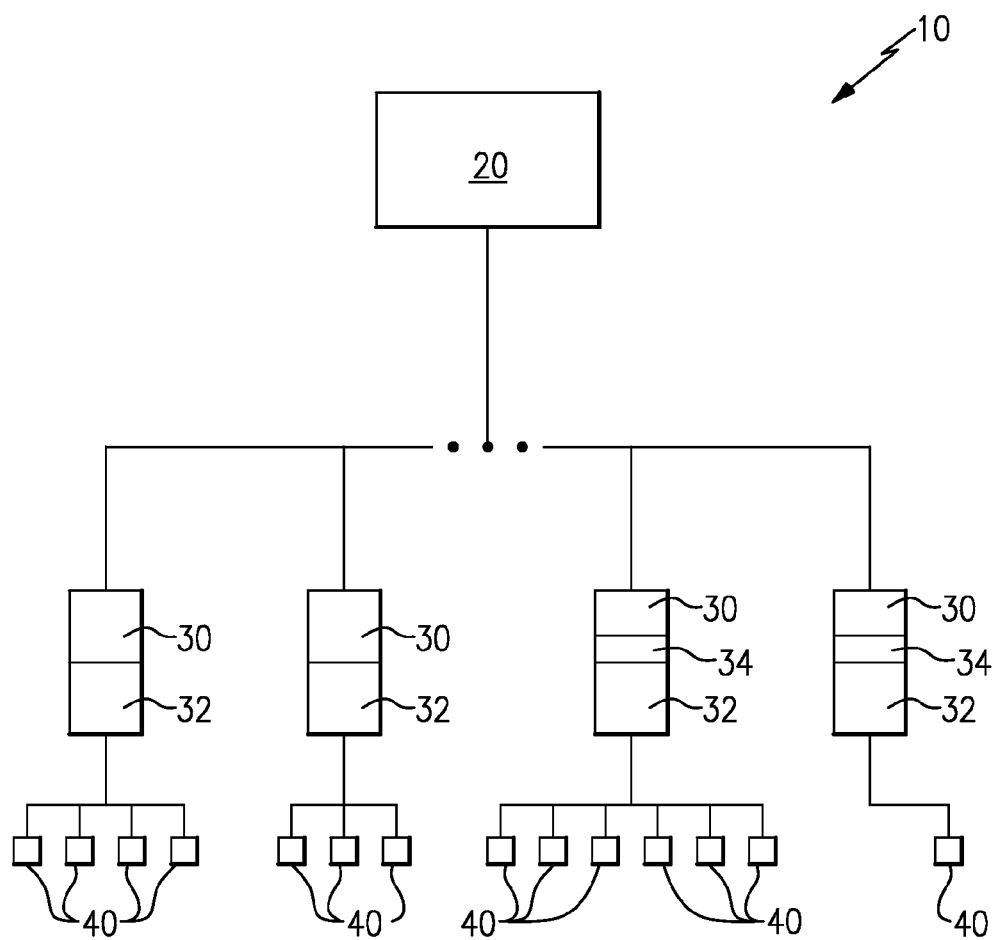
FIG. 1 illustrates a schematic view of a power distribution system.

FIG. 1 schematically illustrates a power distribution system 10. The power distribution system 10 includes a power source 20. The power source 20 can be a generator, a connection to another power distribution system, or any component operable to provide electric power to the power distribution system 10. Connected to the general power source 20 are multiple power distribution modules 30, each of which is capable of distributing multi-phase power to at least one load 40. One or more loads 40 are connected to each power distribution module 30 via a mating connector 32. In some instances, the mating connector 32 connects directly to the power distribution module 30, and in other instances, the mating connector 32 is connected to the power distribution module 30 via a Ground Fault Interrupt (GFI) adapter 34.

All of the power distribution modules 30 in the power distribution system 10 are uniform. For purposes of the present disclosure, the term uniform is used to refer to components containing functionally equivalent electronics and interchangeable connections. Similarly, all of the mating connectors 32 for providing power to the specific loads 40 are uniform.

Figure 2:
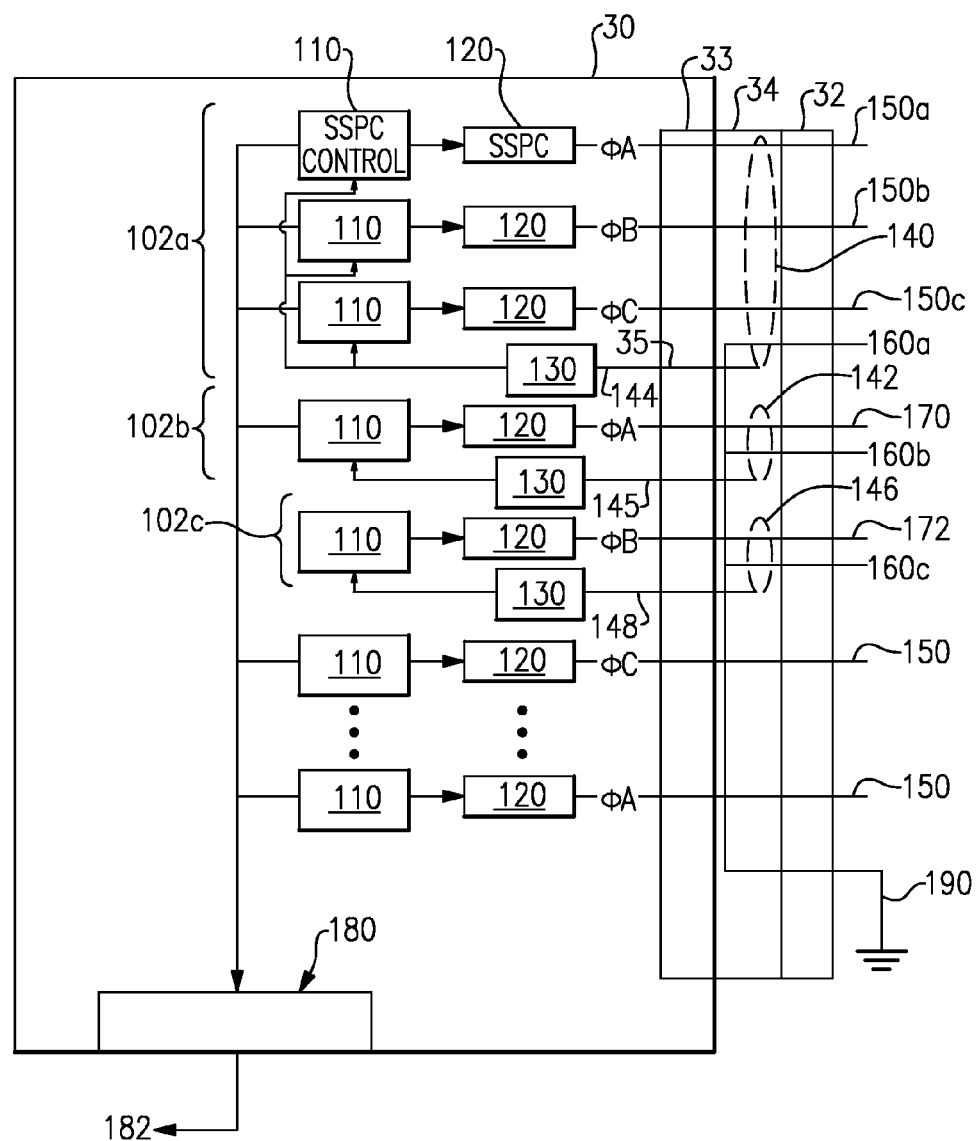
FIG. 2 illustrates a schematic view of a power distribution module connection including a ground fault interrupt adapter.

With continued reference to FIG. 1, FIG. 2 illustrates a schematic view of a power distribution module 30 and a GFI adapter 34 connecting a module connector 33 (illustrated in FIG. 2) of the power distribution module 30 to the mating connector 32. The illustrated power distribution module 30 contains multiple three phase power distribution connections 102a, 102b. On each phase of the three phase power distribution connections 102a, 102b is a solid state power control logic circuit 110 and a solid state power control controller 120. The solid state power controller 120 and the solid state power control logic 110 control the power distribution across the corresponding phase of the power distribution module 30.

A GFI detection circuit 130 can be arranged to receive a three phase current transformer sensor signal 144 from a GFI adapter 34 at an input 35, as illustrated on the top three phase power distribution connection 102a, or arranged to receive single phase sensor signals 146 from the GFI adapter 34, as in the middle three phase power distribution connection 102b. The particular current sensing arrangement utilized varies depending on the needs of a given power system 10 and can be determined by one of ordinary skill in the art in light of the present disclosure.

The mating connector 32 includes a neutral (ground) connection 190 that provides an electric neutral that is distributed through the GFI adapter 34. The mating connector 32 also connects to each phase of the three phase power distribution connections 102 and distributes that power to attached loads 40 according to known power distribution principles.

In order to facilitate GFI protection, a GFI adapter 34 connects the power distribution module 30 to the mating connector 32. The GFI adapter 34 includes multiple current pass throughs 150, each of which is operable to pass current from the power distribution module 30 to the mating connector 32, which in turn passes the power to the electric loads 40. The GFI adapter 34 includes multiple configurations of current transformer (CT) sensors 140, 142, 146. GFI CT sensor 140 provides a function that senses the net current passing through all three phases plus the neutral 160 of a corresponding three phase power distribution connection 102a. In this example, normal operation with balanced or unbalanced three phase power passing through the CT sensor 140 will always have a net current of approximately zero. Thus, if the CT sensor 140 detects a net current that is not zero, a ground fault is present.

In another example, the CT sensor 142 is used to sense the net current passing through a single phase (phase A) of the power distribution connection 102b and an included neutral line 160. In the single phase CT sensor 142 arrangement, a ground fault is detected when the signal 145 representing the current difference of the single phase A wire versus the neutral current 160b exceeds a current threshold. As described above, the sensor readings in either configuration are passed to a GFI detection circuit 130 in the power distribution module 30, via a signal connection 144.

In another example, the CT sensor 146 is used to sense the net current passing through a single phase of the power distribution connection 102c and an included neutral line 160c. In the case of distributing and protecting the phase B load wiring, the CT sensor 146 arrangement is used and a ground fault is detected when the difference current between the phase wire 172 versus the neutral current 160c exceeds a current threshold.

Figure 4:
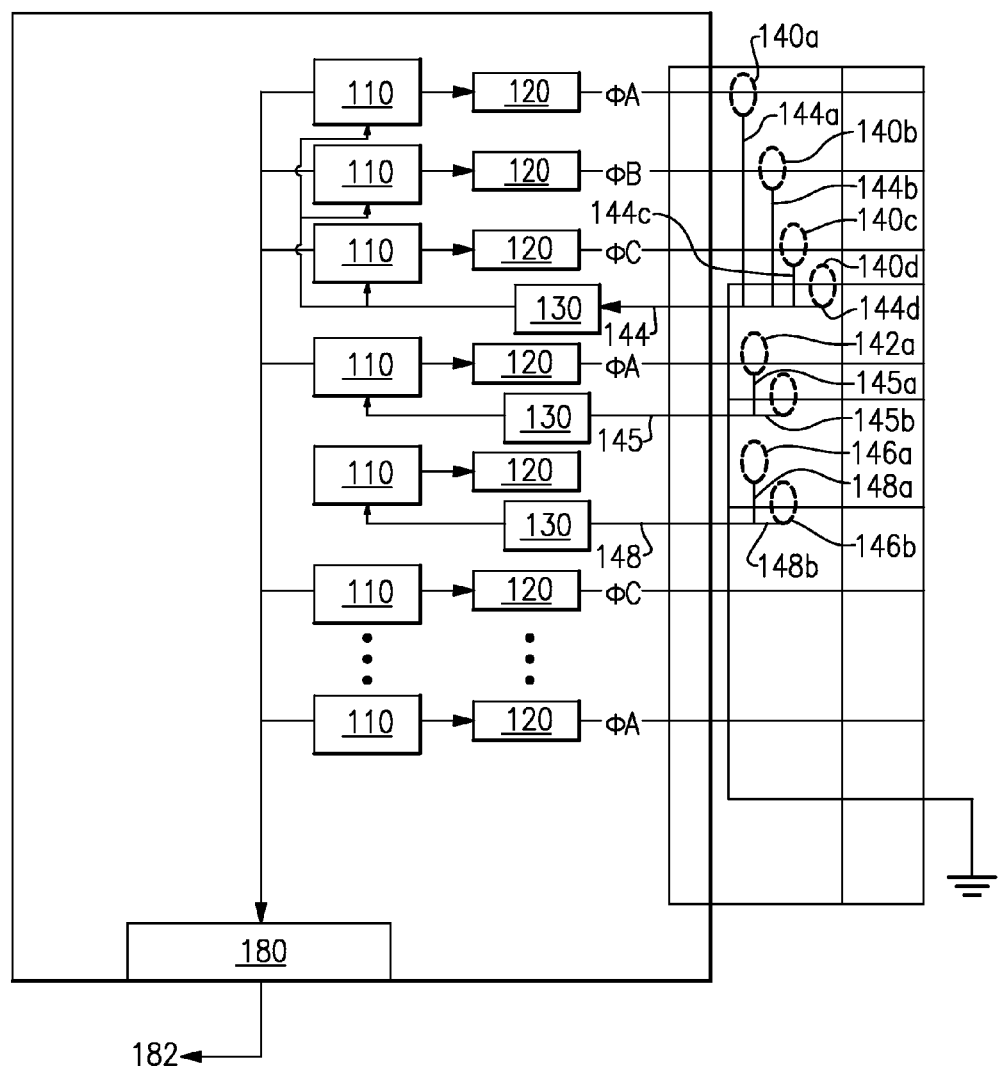
FIG. 4 illustrates an alternate schematic view of a power distribution module connection with an alternate ground fault interrupt adapter.

Alternatively, using a GFI adapter configured as shown in FIG. 4, each individual power wire, and each neutral connection wire may use its own distinct current sensor. In this case, sensor 140a provides output sensor signal 144a, sensor 140b provides output sensor signal 144b, sensor 140c provides output sensor signal 144c, and sensor 140d provides output sensor signal 144d. Each of the individual phase current sensor signals 144a, 144b, 144c, and 144d signals are summed to comprise the Ground Fault signal 144. This method of current sensing may also be used for single phase GFI protected circuits as shown for signals from sensors 142a combined with 142b, and 146a combined with 146b.

The GFI detection circuit 130 is a small, lightweight, circuit that utilizes the sensed current signals 144, 146 to detect when a ground fault is present on the corresponding phase or phases, and alerts the solid state power control logic 110 that a ground fault is detected. The solid state power control logic 110 and the solid state power controller 120 operate in conjunction to trip a fault protection device and remove power from the affected output. The fault protection device can be part of the solid state power controller 120, an independent device in or on the power distribution module 30, or another device connected to the power distribution module 30. The GFI detection circuit 130 can be configured to detect a ground fault on an overall three phase power output 102(a) or detect a ground fault on a single phase of a three phase power output 102(b). In some examples the GFI detection circuit 130 is a single integrated circuit, and is relatively lightweight.

The power distribution module 30 further includes a module communicator 180 with a connection 182 to a central power distribution controller, thereby allowing for centralized control of power distribution throughout the power distribution system 10. In practical aircraft application of this technology, to enhance system safety, a redundant means of verification that the GFI detection circuitry is connected correctly and that there are no wire faults within the GFI adapter is included. The redundant means is achieved through software via the module communicator 180 to the central distribution power controller 182, or through "pin programming" connections between GFI adapter 34 and power distribution module 30.

Figure 3:
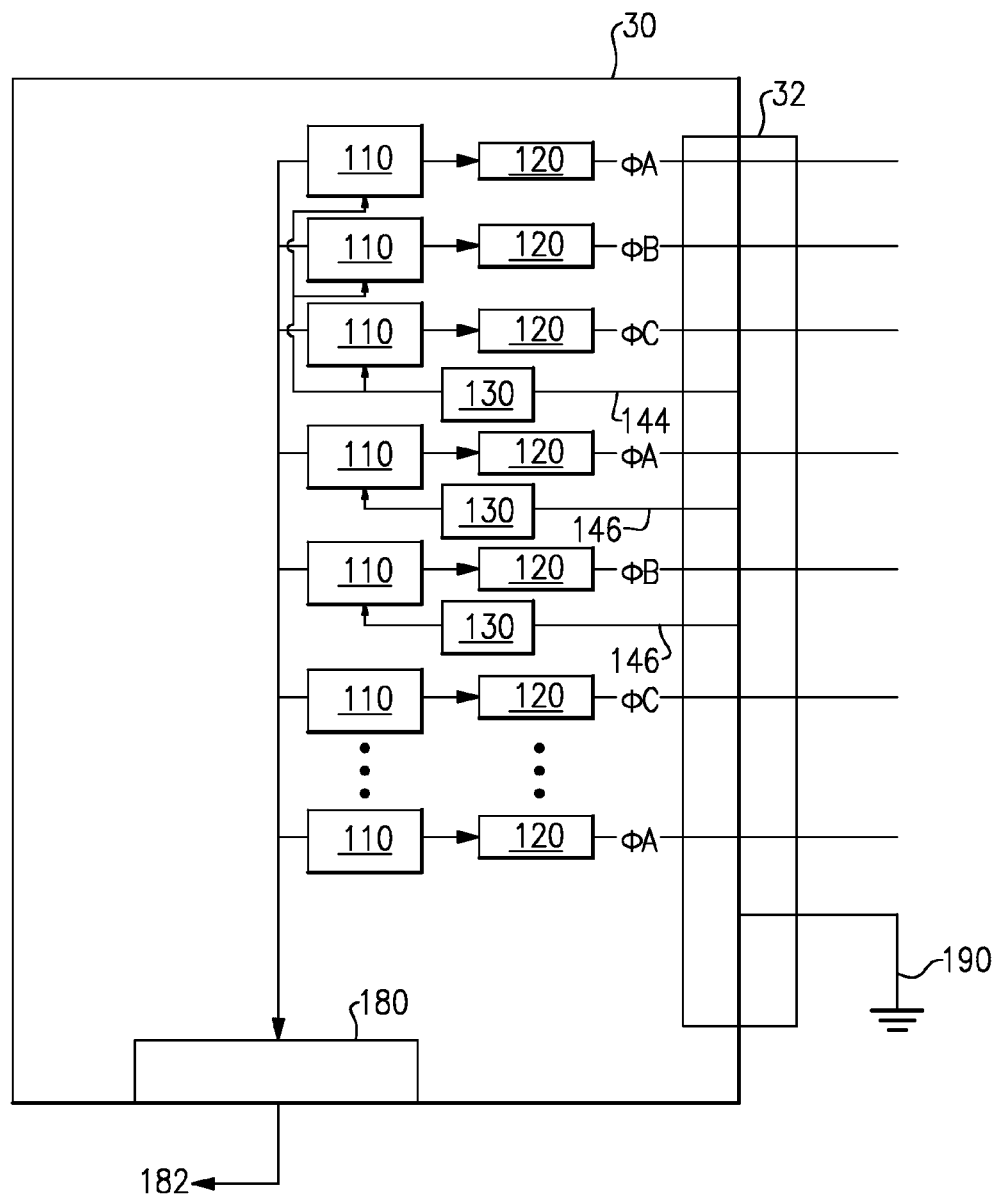
FIG. 3 illustrates a schematic view of a power distribution module connection without a ground fault interrupt adapter.

With continued reference to FIGS. 1 and 2, FIG. 3 illustrates the power distribution module 30 of FIG. 2 and the mating connector 32 of FIG. 2 connected directly to each other, without a GFI adapter 34. As can be seen by comparing FIG. 2 and FIG. 3, the power distribution module 30 is identical regardless of the presence of a GFI adapter 34. Due to the lack of a GFI adapter 34, however, the GFI detection circuit 130 connected to CT sensors 140, 142 in the example of FIG. 2 dead ends at a non-conductive portion of the mating connector 32. This lack of a connection essentially removes the GFI detection circuit 130 from the power distribution module 30. Similarly, the neutral line 190 in the mating connector 32 connects to the housing of the power distribution module 30, and grounds the outer casing of the power distribution module 30, rather than providing neutral connections for the CT sensors 140.

In some example systems, constructed according to the above disclosure, the GFI adapter 34 turns on, or enables, the GFI detection circuit 130 when the GFI adapter 34 is used. In these examples, the GFI detection circuit 130 includes circuit elements to electrically remove the GFI detection circuit 130 from the power distribution module when no GFI adapter is utilized.

A power distribution system 10, utilizing uniform power distribution modules 30 and uniform mating connectors 32, including GFI protection, can be constructed in light of the present disclosure and without the negative weight and cost penalties associated with including current sensors 140, 142 in every power distribution module 30.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A power distribution system comprising:
    a plurality of uniform power distribution modules, wherein each of said power distribution modules includes a module connector;
    a plurality of uniform mating connectors operable to connect to said power distribution modules;
    a plurality of ground fault interrupt adapters, each including
        a first uniform connection operable to interface with the module connector of one of the plurality of uniform power distribution modules and a second uniform connection operable to interface with one of the plurality of uniform mating connectors, such that said ground fault interrupt adapter is operable to connect one of the plurality of uniform power distribution modules to one of the plurality of uniform mating connectors, and
        a current sensor arrangement operable to determine a net current of at least one phase passing through the ground fault interrupt adapter and a neutral passing through the ground fault interrupt adapter; and
    each of the module connectors including at least one net current input operable to receive a detected net current from a ground fault interrupt adapter when a ground fault interrupt adapter is connected to the module connector.

2. The power distribution system of claim 1, wherein said ground fault interrupt adapter includes at least one current sensor operable to sense a ground fault in a connection between said power distribution module and said mating connector.

3. The power distribution system of claim 2, wherein said current sensor is operable to detect a ground fault on a single sensed power phase.

4. The power distribution system of claim 2, wherein said current sensor is operable to detect a ground fault present in a sensed poly-phase power signal.

5. The power distribution system of claim 1, wherein each of said uniform power distribution modules includes at least one ground fault interrupt detection circuit.

6. The power distribution system of claim 5, wherein said at least one ground fault interrupt detection circuit is an integrated circuit.

7. The power distribution system of claim 5, wherein said determined net current from said ground fault interrupt adapter is communicated through a corresponding net current input to said ground fault interrupt detection circuit.

8. A ground fault interrupt (GFI) adapter for a power distribution system comprising:
   a first uniform connection operable to interface with a uniform module connector of a power distribution module and a second uniform connection operable to interface with a uniform mating connector;
   a plurality of power phase pass throughs operable to pass electrical power from the power module connector to the mating connector through said ground fault interrupt adapter;
   at least one current sensor operable to sense a net current passing through said ground fault interrupt adapter; and
   at least one neutral connection operable to connect a neutral line within said ground fault interrupt adapter to a neutral line of the uniform mating connector.

9. The ground fault interrupt adapter of claim 8, wherein each of said at least one current sensors further comprise an output operable to connect each of said at least one current sensors to a ground fault interrupt detection circuit in a connected power distribution module.

10. The ground fault interrupt adapter of claim 8, wherein one of said at least one current sensor is a current transformer sensor.

11. The ground fault interrupt adapter of claim 10, wherein said current transformer sensor surrounds each phase of a balanced multiphase pass through and a neutral line, such that said current transformer sensor is operable to detect when said multiphase pass through is out of balance.

12. The ground fault interrupt adapter of claim 10, wherein said current transformer sensor surrounds a single phase pass through and a neutral, such that said current transformer sensor is operable to detect a current level passing through said single phase pass through.

13. A method for providing ground fault interrupt protection in a power distribution system comprising:
   connecting uniform mating connectors to uniform power distribution modules directly at connections not requiring ground fault interrupt protection; and
   connecting uniform mating connectors to uniform power distribution modules via a ground fault interrupt adapter at connections requiring ground fault interrupt protection, wherein the ground fault interrupt adapter comprises
      a first uniform connection operable to interface with a module connector of the uniform power distribution module and a second uniform connection operable to interface with the uniform mating connector, such that said ground fault interrupt adapter is operable to connect one of the plurality of uniform power distribution modules to one of the plurality of uniform mating connectors, and
      a current sensor arrangement detecting a net current of at least one phase and a neutral passing through the ground fault interrupt adapter; and
   communicating the detected net current from said ground fault interrupt adapter to said module connector of the uniform power distribution module;
   determining the presence of a ground fault at said connection based on said detected net current using a ground fault detection circuit in said uniform power distribution modules.

14. The power distribution system of claim 1, wherein each of said plurality of uniform mating connectors corresponds to a single load, and wherein each of said plurality of uniform mating connectors requiring ground fault interrupt protection is connected to a corresponding uniform power distribution module through a dedicated ground fault interrupt adapter.

15. The ground fault interrupt (GFI) adapter of claim 8, wherein the ground fault interrupt adapter is a dedicated ground fault interrupt adapter corresponding to a single load.

\* \* \* \* \*